(12) United States Patent
Holby

(10) Patent No.: US 10,687,479 B2
(45) Date of Patent: Jun. 23, 2020

(54) DRAINAGE COLLECTION POTS FOR PLANTS

(71) Applicant: Plantlogic LLC, Smyrna, GA (US)

(72) Inventor: Israel Holby, Sharpsburg, GA (US)

(73) Assignee: Plantlogic, LLC, Smyrna, GA (US)

( * ) Notice: Subject to any disclaimer, the term of this patent is extended or adjusted under 35 U.S.C. 154(b) by 265 days.

(21) Appl. No.: 15/007,697

(22) Filed: Jan. 27, 2016

(65) Prior Publication Data

US 2017/0208750 A1    Jul. 27, 2017

(51) Int. Cl.
*A01G 9/02* (2018.01)
*A01G 9/029* (2018.01)

(52) U.S. Cl.
CPC ............... *A01G 9/021* (2013.01); *A01G 9/02* (2013.01); *A01G 9/029* (2018.02)

(58) Field of Classification Search
CPC . A01G 9/00; A01G 9/027; A01G 9/10; A01G 9/104; A01G 9/27; A01G 9/31; A01G 9/02; A01G 9/021; A01G 9/047
See application file for complete search history.

(56) References Cited

U.S. PATENT DOCUMENTS

| | | | | |
|---|---|---|---|---|
| 195,094 | A | * | 9/1877 | Crowther ............... A01G 27/02 47/65.6 |
| 1,775,831 | A | | 9/1930 | Salisbury |
| 2,394,192 | A | * | 2/1946 | Mann ...................... A01G 9/02 47/1.01 R |
| 2,834,153 | A | | 5/1958 | Fearn |
| 2,854,790 | A | | 10/1958 | Hartung |
| 3,603,034 | A | * | 9/1971 | Maxwell-Stewart .... A01G 9/10 206/423 |
| 3,961,443 | A | * | 6/1976 | Insalaco ................... A01G 9/00 206/423 |
| D245,241 | S | | 8/1977 | Robinson |
| 4,057,931 | A | | 11/1977 | Stutelberg |
| 4,173,097 | A | | 11/1979 | Staby |
| 4,216,622 | A | * | 8/1980 | Hollenbach ............ A01G 9/029 47/71 |
| 4,232,482 | A | | 11/1980 | Watt et al. |
| 4,248,013 | A | * | 2/1981 | Allen ..................... A01G 31/02 47/59 R |

(Continued)

FOREIGN PATENT DOCUMENTS

| CN | 204518620 U | 8/2015 |
|---|---|---|
| CN | 204518621 U | 8/2015 |

(Continued)

OTHER PUBLICATIONS http://www.bato.nl/en/uni-trough, accessed Oct. 2015.

(Continued)

*Primary Examiner* — Thanh Pham
(74) *Attorney, Agent, or Firm* — Dickinson Wright, PLLC; Michael E. Noe, Jr.

(57) ABSTRACT

A container for a plant may include a base having an axis, a width transverse to the axis, a bottom, and a sidewall extending axially upward from and circumscribing the base. A tier of holes may be formed in the base. The holes in the tier may span a substantially entire width of the base. In addition, the tier of holes may be located at a substantially lowest elevation of the base to define a trough at the bottom of the base.

1 Claim, 15 Drawing Sheets

(56) References Cited

U.S. PATENT DOCUMENTS

| | | | |
|---|---|---|---|
| 5,040,330 A * | 8/1991 | Belgiorno | A01G 9/10 47/65.6 |
| 5,251,399 A * | 10/1993 | Rasmussen | A01G 9/023 211/88.03 |
| 5,299,384 A | 4/1994 | Andrews | |
| 5,327,679 A | 7/1994 | Hawthorne | |
| 5,430,973 A * | 7/1995 | Luo | A01G 9/02 47/66.6 |
| 5,448,854 A | 9/1995 | Hirsch et al. | |
| 5,459,960 A * | 10/1995 | Manlove | B29C 47/0023 47/65.5 |
| 6,047,499 A | 4/2000 | Staas | |
| 6,289,632 B1 | 9/2001 | Boling | |
| 7,093,391 B2 | 8/2006 | Eakin | |
| 7,624,535 B2 | 12/2009 | Schmidt | |
| 7,673,417 B2 | 3/2010 | Smith et al. | |
| 8,312,674 B2 | 11/2012 | Adams | |
| 8,434,261 B2 | 5/2013 | Nobbe | |
| 9,185,853 B1 * | 11/2015 | Ascherman | A01G 9/02 |
| 2002/0088171 A1 * | 7/2002 | Shepherd | A01G 9/16 47/17 |
| 2003/0167688 A1 | 9/2003 | Atchley et al. | |
| 2005/0086861 A1 | 4/2005 | Atchley | |
| 2005/0086863 A1 | 4/2005 | Brutsche, III et al. | |
| 2006/0277825 A1 | 12/2006 | Sanders | |
| 2007/0157513 A1 * | 7/2007 | Varney | A01G 9/026 47/65.8 |
| 2007/0214718 A1 * | 9/2007 | Park | A01G 9/02 47/79 |
| 2008/0022591 A1 * | 1/2008 | Jung | A01G 9/02 47/73 |
| 2010/0154303 A1 * | 6/2010 | Smith | A01G 9/02 47/66.7 |
| 2011/0016784 A1 * | 1/2011 | Taber | A01G 9/025 47/79 |
| 2011/0036003 A1 * | 2/2011 | Schmidt | A01G 9/021 47/65.7 |
| 2013/0133255 A1 * | 5/2013 | Wu | A01G 9/02 47/66.1 |
| 2013/0340337 A1 * | 12/2013 | Kuo | A01G 9/023 47/82 |
| 2016/0212944 A1 | 7/2016 | Holby | |

FOREIGN PATENT DOCUMENTS

| | | |
|---|---|---|
| CN | 204540084 U | 8/2015 |
| EP | 1037521 | 9/2000 |
| EP | 1527676 | 5/2005 |
| FR | 2312944 A1 | 12/1976 |
| GB | 103027 | 1/1917 |
| GB | 2161358 | 1/1986 |
| WO | 9930553 | 6/1999 |
| WO | 2015006370 A1 | 1/2015 |

OTHER PUBLICATIONS

Technical Search, 2015, 2 pgs.
Technical Search, 2016, 2 pgs.
U.S. Appl. No. 14/885,823, filed Oct. 16, 2015.
Foreign Communication from Related Counterpart Application; European Patent Application No. 17153108; Extended European Search Report dated Jul. 7. 2017; 8 pages.
Extended European search report with regard to European application No. 16 152 283.4, dated May 9, 2016.
Communication from a foreign patent office in a foreign counterpart application, National Institute of Industrial Property Ministry of Economy (INAPI), Chili office action and search report for Application No. CL201700186, dated May 22, 2018, 8 pages.

* cited by examiner

DRAINAGE COLLECTION POTS FOR PLANTS

BACKGROUND OF THE INVENTION

Field of the Disclosure

The present invention relates in general to pots and, in particular, to a system, method and apparatus for drainage collection pots for plants.

Description of the Related Art

Drainage collection from potted plants is valuable for growers that wish to control the disposal of waste water (drainage) for environmental protection, or to reuse the solution which contains salt and fertilizer. Generally, the drainage is collected into holding ponds where solids precipitate out, or it is diluted with clean water and then applied to in-ground crops. Alternatively, in the case of very dry environments, it is reused after passing through or mixing with water that has passed through a reverse osmosis system.

On a larger scale, this type of drainage is potentially a kind of environmental pollution if allowed to flow into rivers, streams and groundwater. Fertilizer from golf courses and other agriculture is already being blamed for algae blooms. Several countries, especially in Europe, have passed regulations that require growers to collect waste water that contains fertilizer. These regulations will start to be enforced within several years in some countries.

Some growers place their pots in wide gutters to collect drainage. However, wide gutters have some disadvantages. For example, a gutter as wide as or wider than the pot is expensive and requires near-perfect grading over a large area. In addition, evaporation occurs in wide gutters. Evaporation wastes water and increases the humidity within greenhouses, which can effect flowering, fruiting and encourage some diseases. Leaves and other debris also can more readily accumulate in wide gutters, which impedes flow through the gutter and causes water to pool. Thus, improvements in containers for plants continue to be of interest.

SUMMARY

Embodiments of a container for a plant may include a base having an axis, a width transverse to the axis, a bottom, and a sidewall extending axially upward from and circumscribing the base. A tier of holes may be formed in the base. The holes in the tier may span a substantially entire width of the base. In addition, the tier of holes may be located at a substantially lowest elevation of the base to define a trough at the bottom of the base.

Another version of a container may include a base having an axis, a sidewall extending axially upward from and circumscribing the base, and a bottom having an upper elevation and a lower elevation that is axially lower than the upper elevation. The lower elevation may define a trough at a central and lowest-most portion of the base. A first set of holes may be formed in the trough at the lower elevation, and may be configured to permit liquid drainage from the container. A second set of holes may be formed in the upper elevation and configured to substantially only permit air uptake to roots of a plant in the container, and configured to not facilitate liquid drainage from the container.

One embodiment of a container may include a base having an axis, a width transverse to the axis, a bottom with holes, a sidewall extending axially upward from and circumscribing the base, a plurality of legs extending below lowest-most holes in the base, and feet connecting the plurality of legs. The container may include only two feet, and half of the legs may be coupled to each foot.

An alternate example of a container may include a body that is hollow and has an open top and an open bottom, each with no closure. The open top and the open bottom may be similar in size. In addition, a tray may be configured to seat inside the body adjacent the open bottom of the container to substantially close the open bottom.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
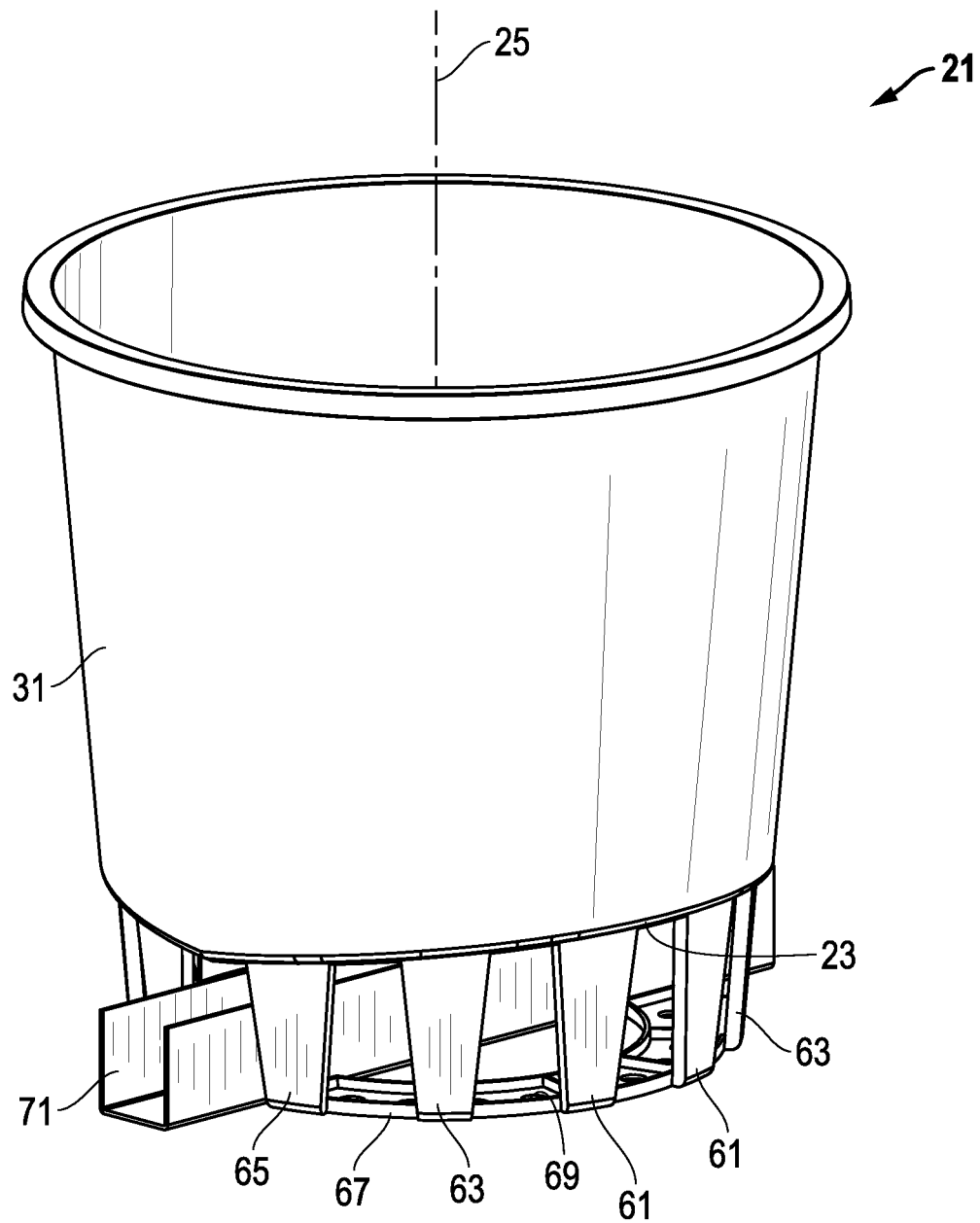
FIG. 1 is a top isometric view of an embodiment of a container and gutter.
Figure 2:
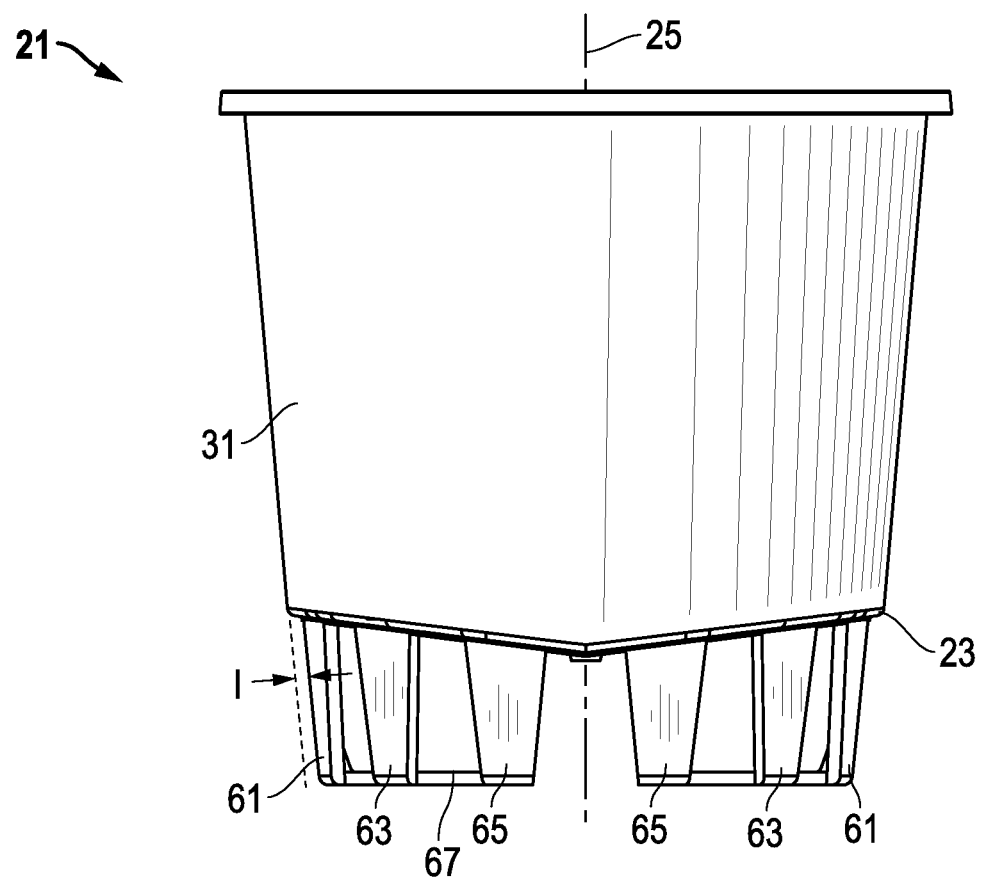
FIG. 2 is a front view of the container of FIG. 1.
Figure 3:
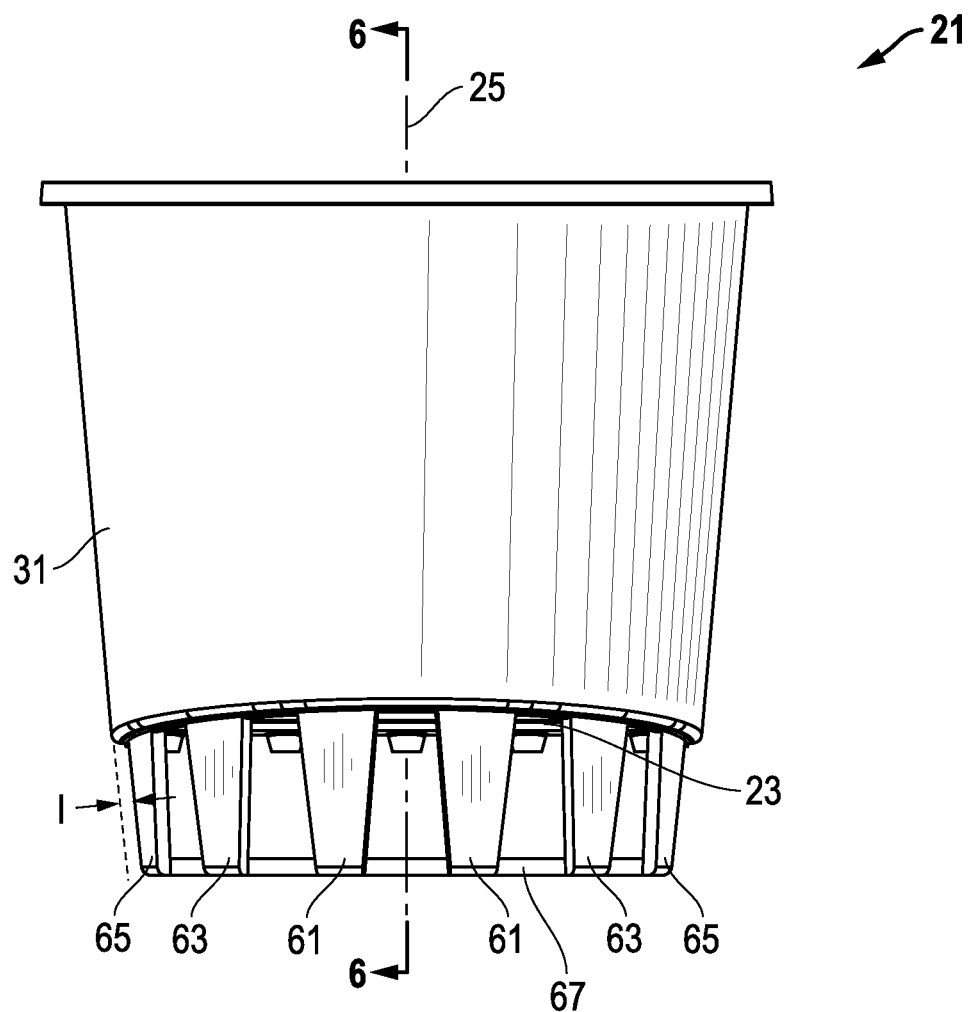
FIG. 3 is a side view of the container of FIG. 1.
Figure 4:
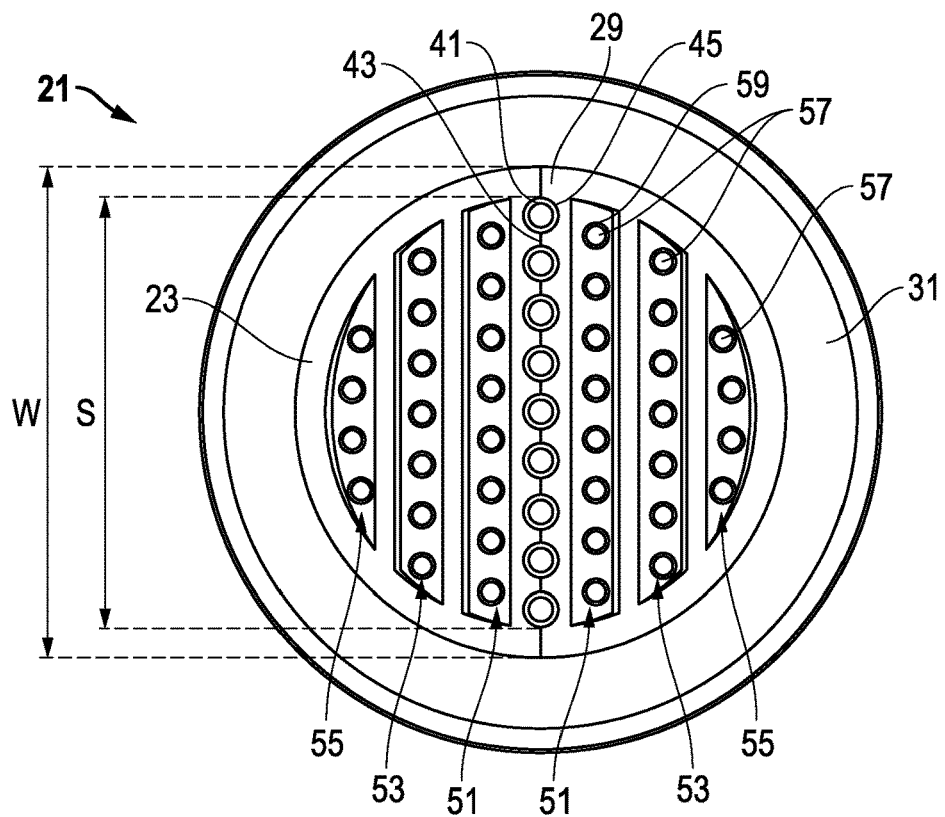
FIG. 4 is a top view of the container of FIG. 1.
Figure 5:
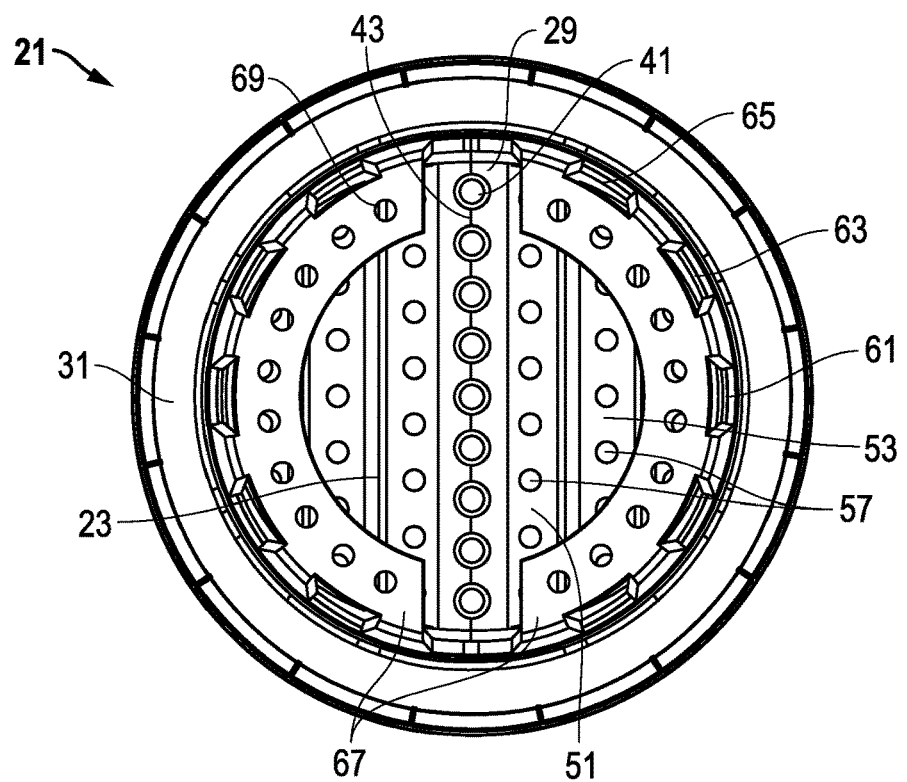
FIG. 5 is a bottom view of the container of FIG. 1.
Figure 6:
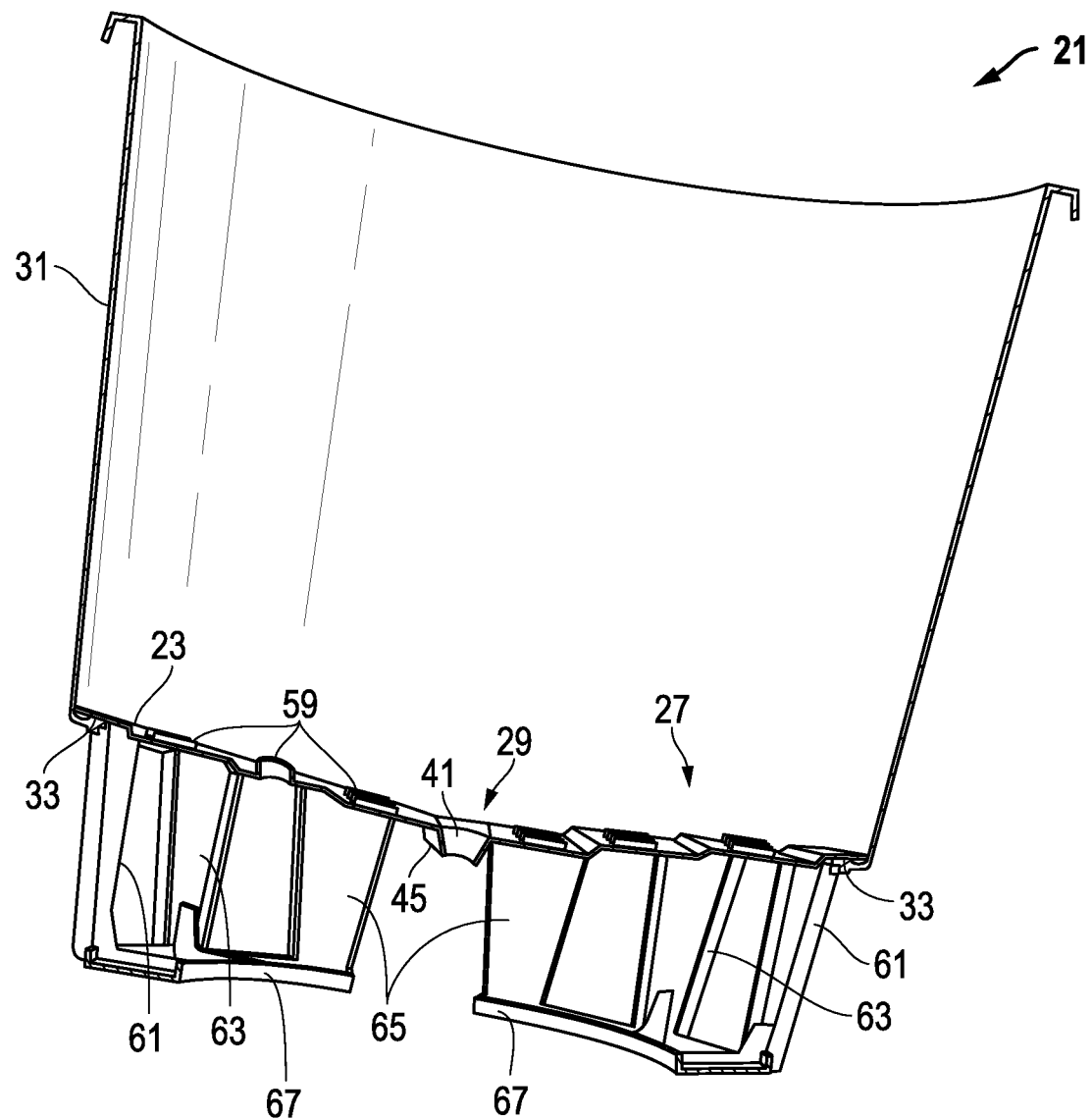
FIG. 6 is a sectional view of the container of FIG. 1, taken along the line 6-6 of FIG. 3.
Figure 7:
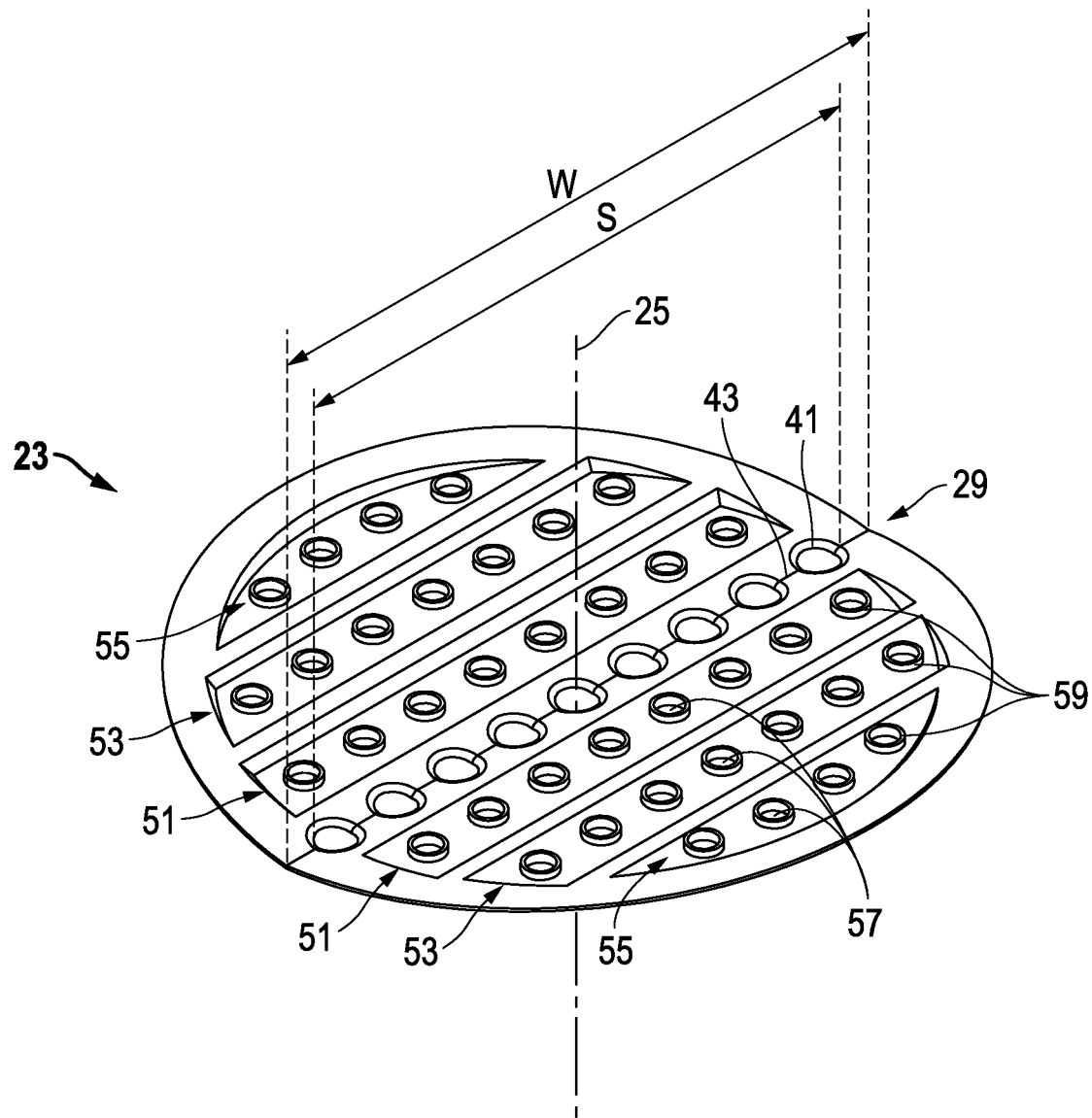
FIG. 7 is a top isometric view of an embodiment of a base for the container of FIG. 1.
Figure 8:
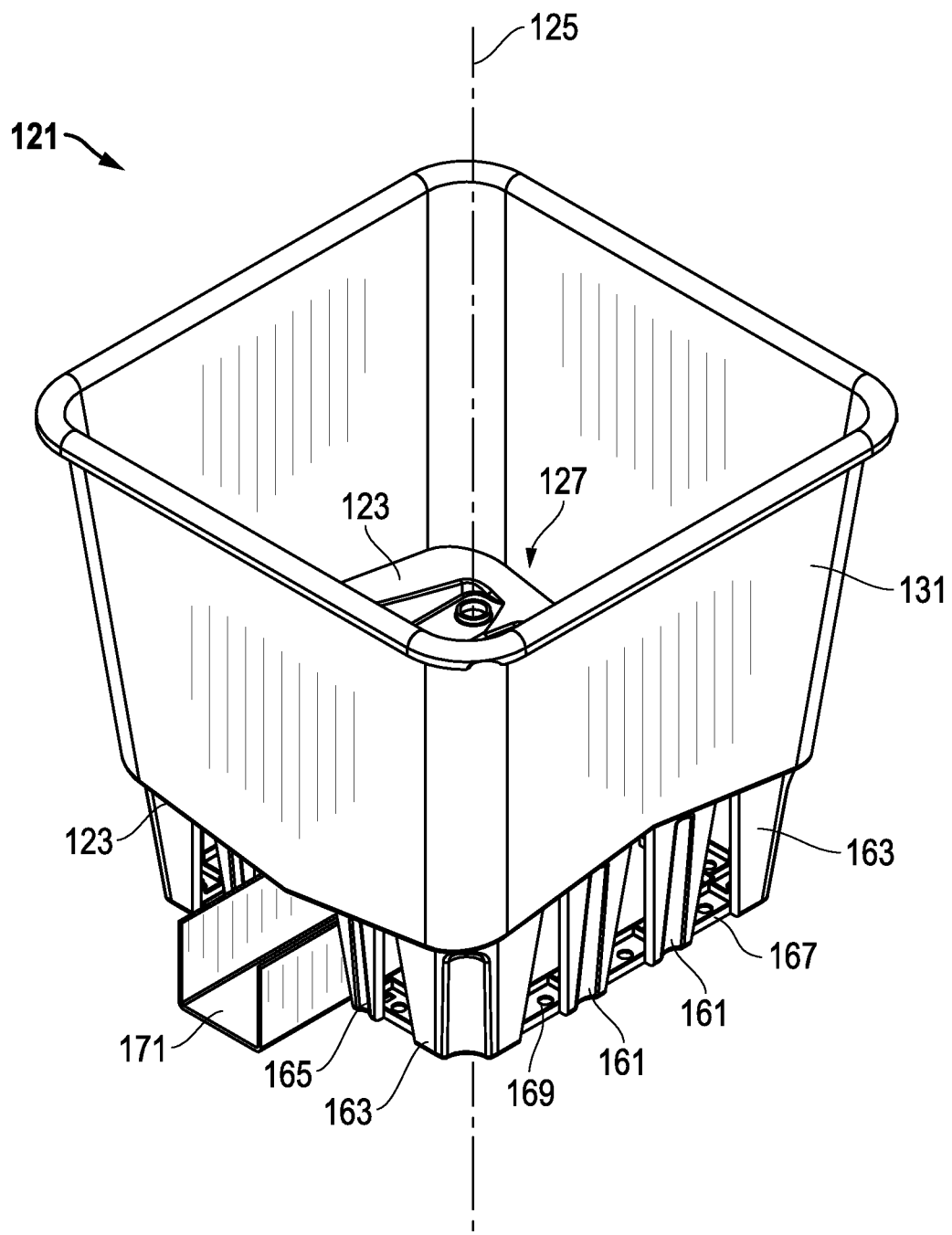
FIG. 8 is a top isometric view of another embodiment of a container and gutter.
Figure 9:
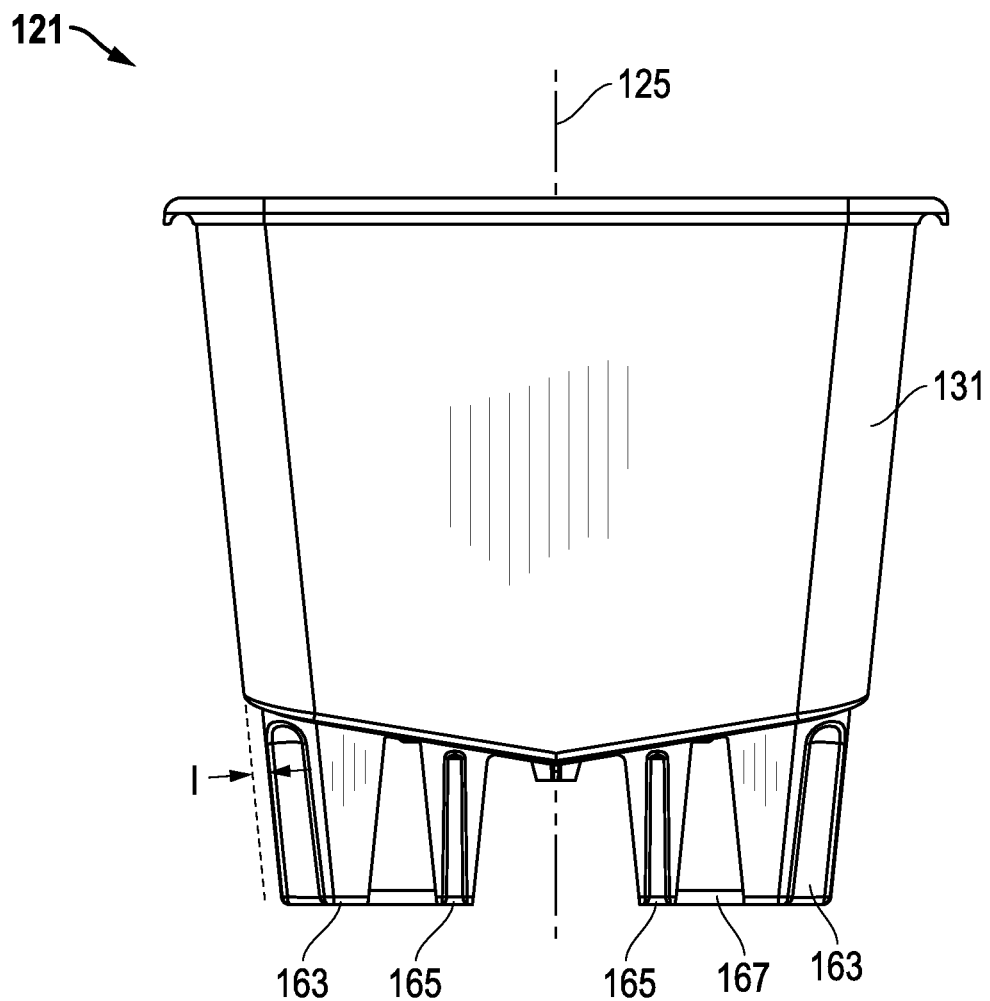
FIG. 9 is a front view of the container of FIG. 8.
Figure 10:
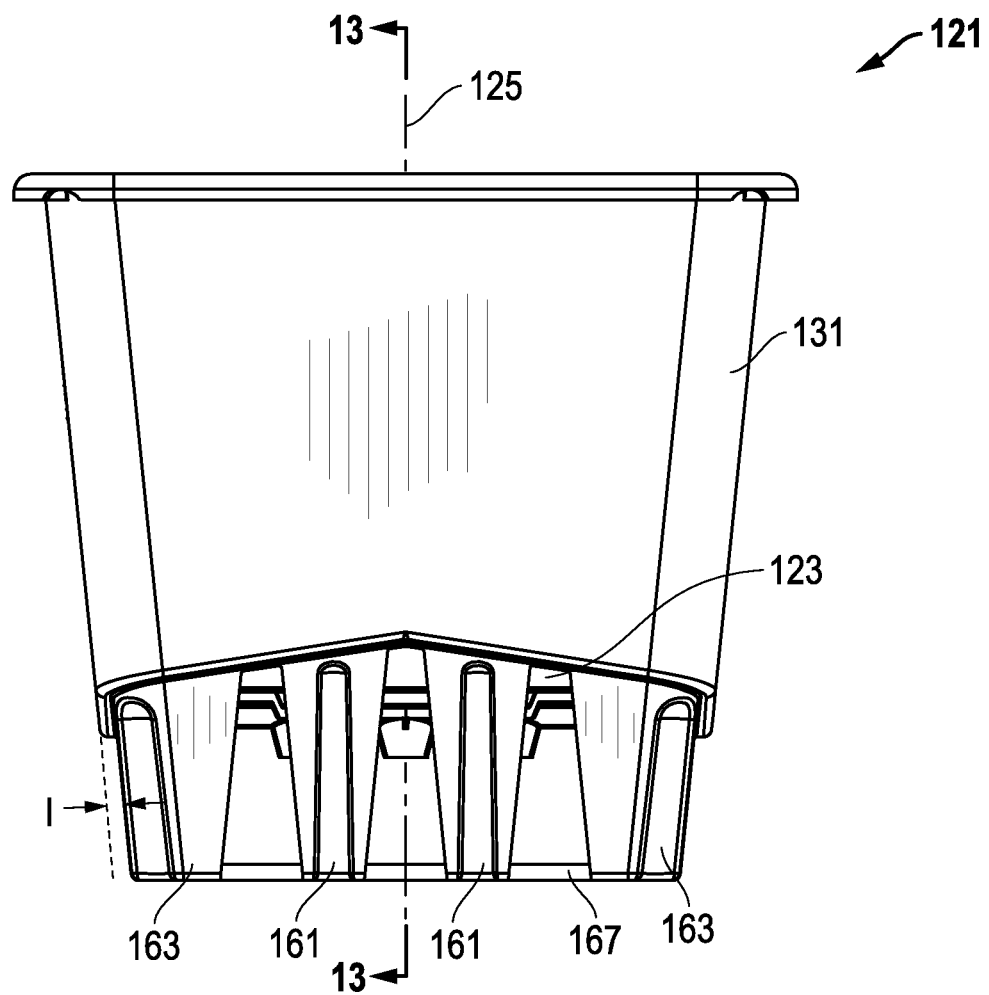
FIG. 10 is a side view of the container of FIG. 8.
Figure 11:
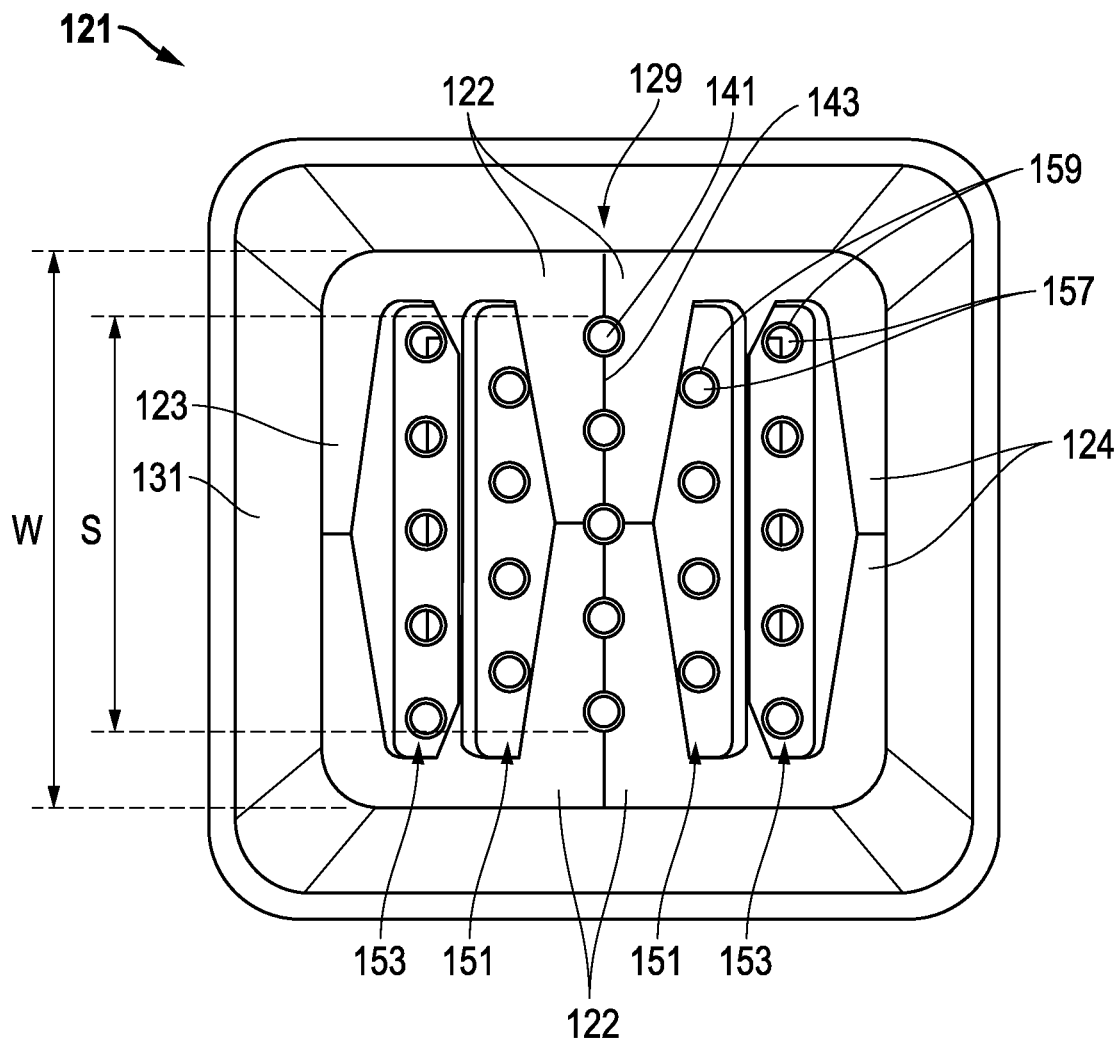
FIG. 11 is a top view of the container of FIG. 8.
Figure 12:
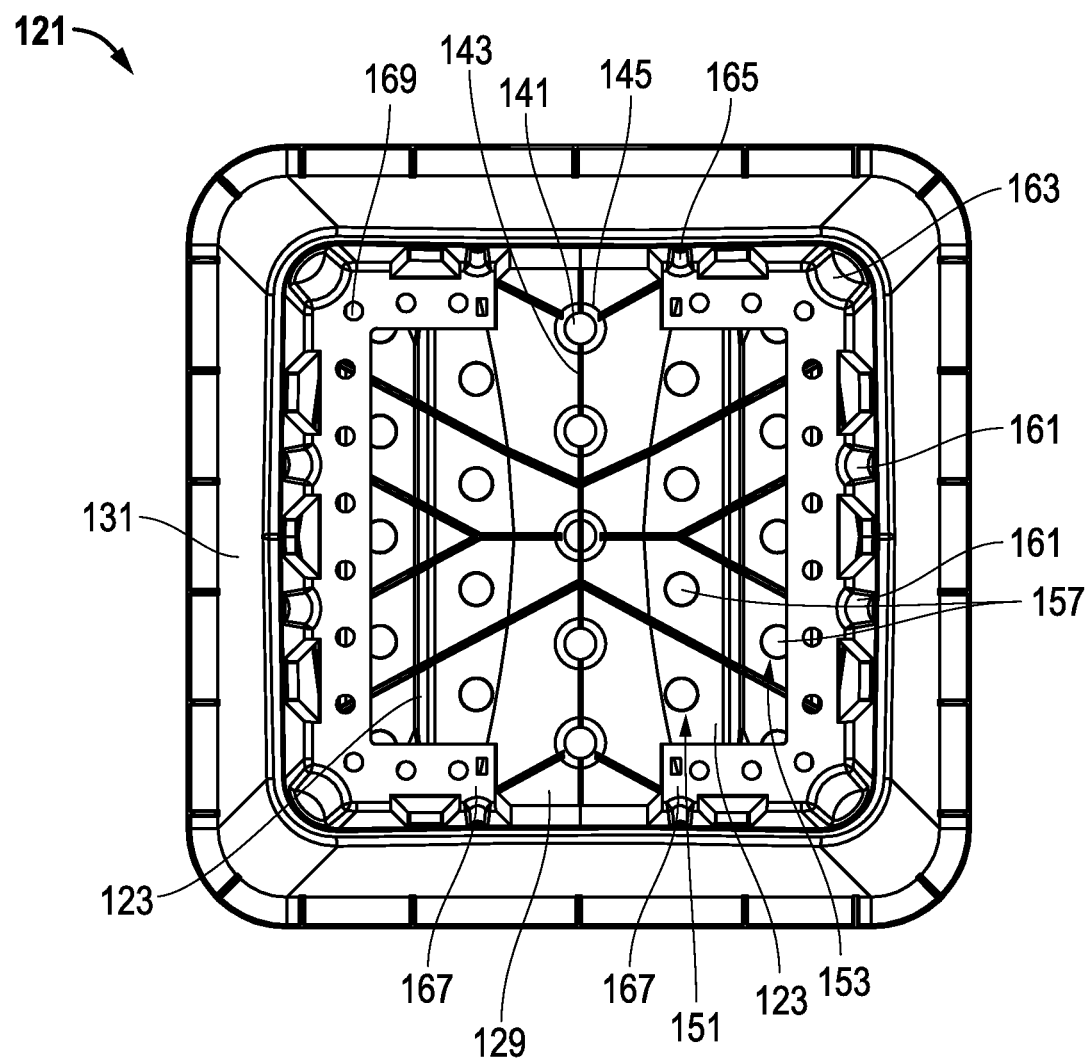
FIG. 12 is a bottom view of the container of FIG. 8.
Figure 13:
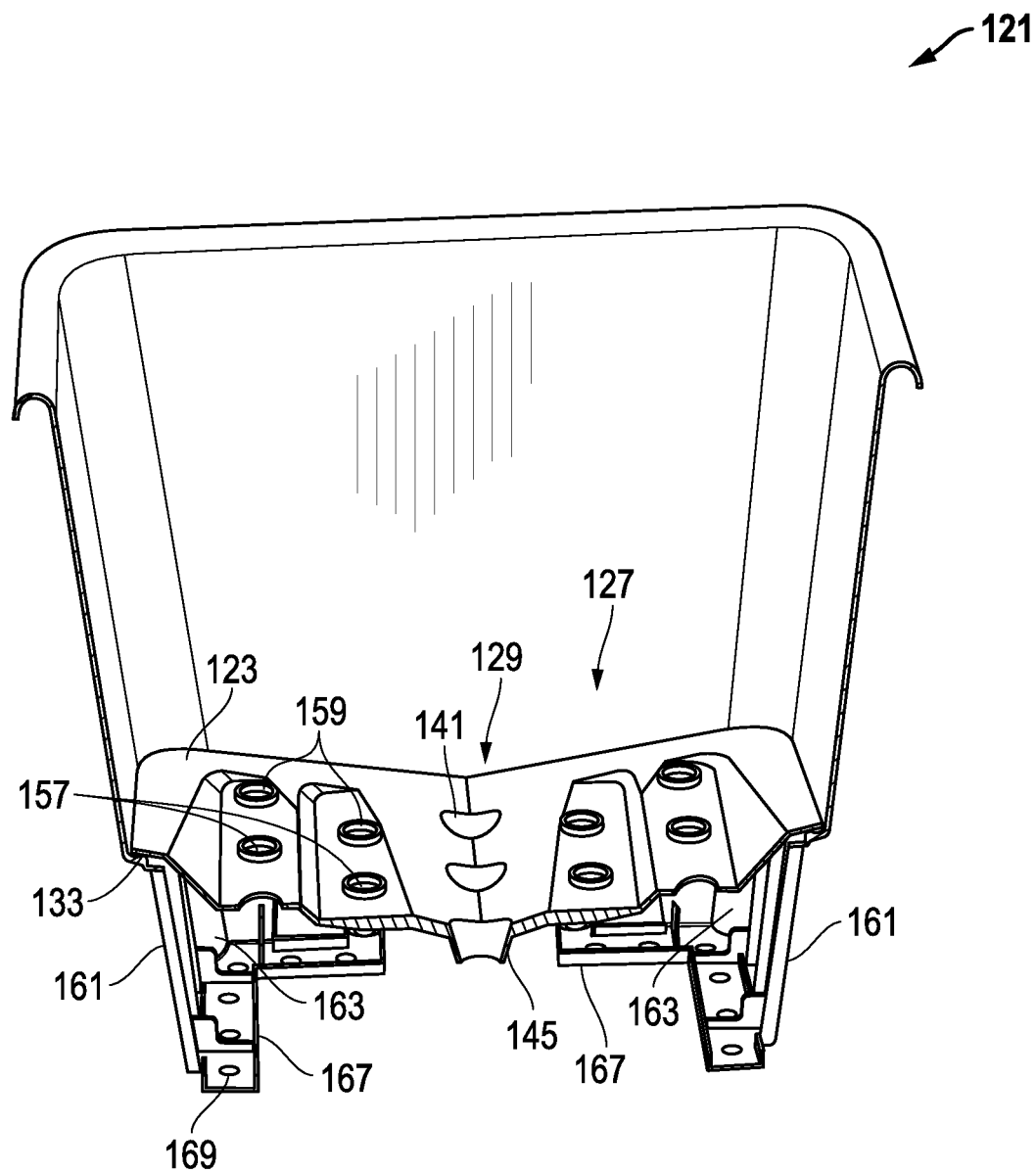
FIG. 13 is a sectional view of the container of FIG. 8, taken along the line 13-13 of FIG. 10.
Figure 14:
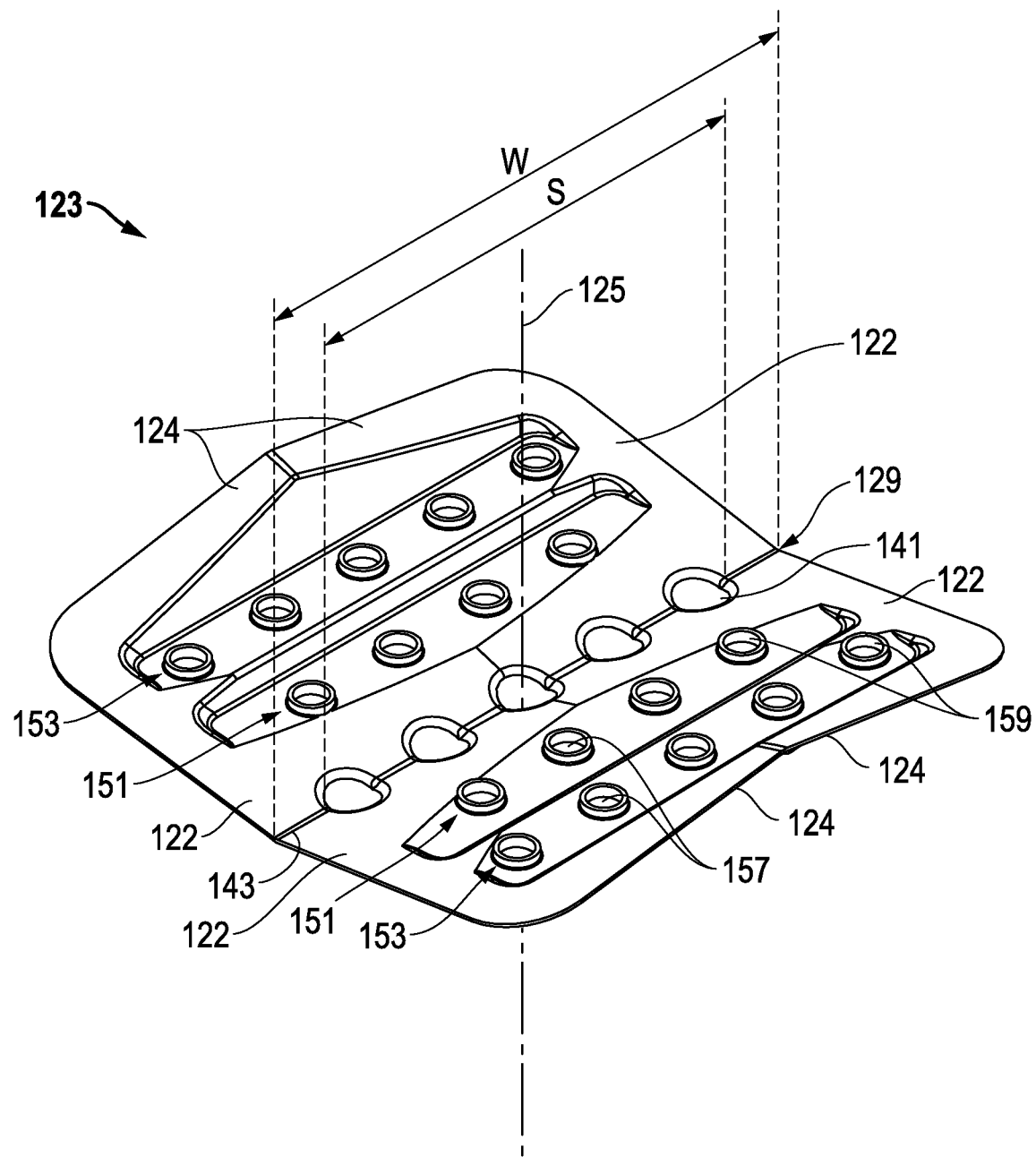
FIG. 14 is a top isometric view of an embodiment of a base for the container of FIG. 8.

Embodiments of a system, method and apparatus for a pot or container for a plant are disclosed. The container may be configured in a variety of shapes, such as round (FIGS. 1-7), polygonal (FIGS. 8-16), and still other shapes.

For example, a container 21 may comprise a tray or base 23 having an axis 25, a width W (FIGS. 4 and 7) transverse to the axis 25, a bottom 27 (FIG. 6), and a sidewall 31 extending axially upward from and circumscribing the base 23. Embodiments of the base 23 may be tapered in at least one direction, such as toward a trough 29, as shown. In other embodiments, the base 23 may be tapered in at least two directions, as is described elsewhere herein.

Embodiments of the base 23 may include a tier of holes 41. In some versions, the holes 41 in the tier span a substantially entire width W of the base 23. In addition, the tier of holes 41 may be located at a substantially lowest elevation of the base 23 to define the trough 29 at the bottom of the base 23. In one example, the trough 29 may intersect the axis 25, and the holes 41 may be aligned linearly. The trough 29 can be diametral.

As shown in the illustrated embodiment, the trough 29 may be at a different elevation than another portion of the base 23. Embodiments of the trough 29 can be at a substantially constant elevation with respect to the axis 25, such that the holes 41 in the tier are substantially co-planar. In another version, the holes 41 in the tier are not necessarily co-planar. For example, a crease 43 (FIGS. 4, 5 and 7) that is convex may linearly bisect the trough 29, such that portions of each hole 41 are inclined relative to each other on each side of the crease 43.

Embodiments of the holes 41 may comprise a distance or span S that is transverse to the axis 25. For example, the span S can be at least about 90% of the width W, or at least about 80% of the width W. In another example, the holes 41 may be spaced apart from ends of the trough 29, such that no holes 41 coincide with the ends of the trough 29. The holes 41 may comprise various shapes, such as frustoconically tapered. In a version, the holes 41 are not necessarily cylindrical. In some embodiments, at least some of the holes 41 may have circumscribing walls 45 (FIGS. 4 and 6) that extend axially downward therefrom. In one version, the walls 45 may be frustoconical in shape.

In some embodiments, the container 21 may further include a plurality of rows of holes in the base 23. For example, in the illustrated embodiment, base 23 may include rows 51, 53, 55 (FIGS. 5-7), each having holes 57. Base 23 may have more or fewer rows 51, 53, 55 and more or fewer holes 57. Holes 57 may be identical, or may differ from each other in some aspect. In one version, the holes 57 in each individual row 51, 53, 55 may be aligned with each other. In another version, the holes 57 in each individual row 51, 53, 57 may be co-planar. In some embodiments, the rows 51, 53, 55 may be parallel to each other and, optionally, to the trough 29. As shown in the drawings, at least some of the rows 51, 53, 55 may be at different vertical elevations relative to the axis 25 and to each other. For example, the rows 51, 53, 55 may be arrayed in a terraced pattern, as depicted. In another example, the rows 51, 53, 55 may be grouped in pairs of identical rows (e.g., two rows 51, two rows 53, and two rows 55).

In one version, at least some of the holes 57 in the rows 51, 53, 55 may be cylindrical. In another version, the holes 41 in the trough 29 may differ in size from the holes 57 in the rows 51, 53, 55. For example, the holes 41 in the trough may be larger than the holes 57 in the rows 51, 53, 55. In another example, the holes 57 in the rows 51, 53, 55 may be substantially the same size. In some embodiments, at least some of the holes 57 in the rows 51, 53, 55 may include circumscribing walls 59 (FIGS. 6 and 7) extending axially upward therefrom. In one version, the walls 59 may be cylindrical or other shapes.

In some embodiments, the base 23 may be integrally formed with the sidewall 31, such that the container 21 is monolithic. In other embodiments, the base 23 may be seated adjacent a bottom on an interior of the sidewall 31, such that the base 23 is removable from the sidewall 31. For example, the sidewall 31 may include an inner lip 33 (FIG. 6) circumscribing the bottom, such that the base 23 seats on the inner lip 33. In a version, the base 23 may have an interference fit with the sidewall 31, such that the base 23 is snugly retained by the sidewall 31.

Embodiments of the container 21 may include legs. For example, container 21 may include legs 61, 63, 65, which may extend axially downward from the sidewall 31. In some versions, the legs 61, 63, 65 may include at least two different lengths, or at least three different lengths, as shown. In an example, the legs 61, 63, 65 may be laterally inset (FIGS. 2 and 3) by a distance I from an outer surface of the sidewall 31. In some embodiments, the legs 61, 63, 65 may or may not be parallel to the sidewall 31. In another version, the legs 61, 63, 65 and the sidewall 31 may or may not be parallel to the axis 25. Embodiments of the container 21 may include feet 67 at bottoms of the legs 61, 63, 65. In an example, the container 21 may have only two feet 67. In another example, half of the legs 61, 63, 65 may be coupled to each foot 67. Versions of the feet 67 may be spaced apart from each other, such as directly beneath the trough 29. In addition, the feet 67 may be planar, and the feet 67 can be perpendicular to the axis 25. A version of the feet 67 may be arcuate (as shown), or rectilinear as described elsewhere herein. The feet 67 also may include drainage holes 69.

In some embodiments, a gutter 71 may be provided for container 21. In the illustrated embodiment of FIG. 1, the gutter 71 may comprise a u-shaped structural channel, but could comprise other shapes as well, such as semi-cylindrical. The gutter 71 may be located between and straddled by feet 67, which may be directly beneath trough 29. In this way, gutter 71 may be used to catch and channel liquid drainage from container 21 to a desired location. The length of gutter 71 may vary depending on the application. For example, a plurality of containers 21 may be aligned along a gutter 71, such their collective drainage may be pooled and directed as desired.

Referring now to FIGS. 8-15, another embodiment of a container 121 is shown. For ease of reference, container 121 is primarily referenced with two last digits that are substantially the same as the reference numerals for the embodiment of container 21. For example, base 123 is for container 121, like base 23 is for container 21.

Embodiments of container 121 may comprise the tray or base 123 having an axis 125, a width W (FIG. 14) transverse to the axis 125, a bottom 127 (FIGS. 8 and 13), and a sidewall 131 extending axially upward from and circumscribing the base 123. The container 121 may be polygonal (e.g., square), and the sidewall 131 may include a plurality of sidewalls (e.g., four sidewalls 131 shown). A trough 129 may be included, and may extend between opposite sidewalls 131.

Embodiments of the base 123 may be tapered in at least one direction, such as toward the trough 129. In other embodiments, the base 123 may be tapered in at least a second direction. For example, first sides 122 (FIGS. 11 and 14) of the base 123 may taper downward toward the trough 129, and second sides 124 of the base 123 may taper downward toward ends of the first sides 122 of the base 123. In this way, an axially lowest portion of the base 123 may be located at the trough 129, and an axially highest portion of the base 123 may be located at midpoints of the second sides 124.

Embodiments of the base 123 may include a tier of holes 141. In some versions, the holes 141 in the tier span a substantially entire width W of the base 123. In addition, the tier of holes 141 may be located at a substantially lowest elevation of the base 123 to define the trough 129 at the bottom of the base 123. In one example, the trough 129 may intersect the axis 125, and the holes 141 may be aligned linearly. The trough 129 can be diametral, in some versions.

As shown in the illustrated embodiment, the trough 129 may be at a different elevation than another portion of the base 123. Embodiments of the trough 129 can be at a substantially constant elevation with respect to the axis 125, such that the holes 141 in the tier are substantially co-planar. In another version, the holes 141 in the tier are not necessarily co-planar. For example, a crease 143 (FIGS. 11, 12 and 14) that is convex may linearly bisect the trough 129, such that portions of each hole 141 are inclined relative to each other on each side of the crease 143.

Embodiments of the holes 141 may comprise a distance or span S (FIGS. 11 and 14) that is transverse to the axis 125. For example, the span S can be at least about 90% of the width W, or at least about 80% of the width W. In another example, the holes 141 may be spaced apart from ends of the trough 129, such that no holes 141 coincide with the ends of the trough 129. The holes 141 may comprise various shapes, such as frustoconically tapered. In a version, the holes 141 are not necessarily cylindrical. In some embodiments, at least some of the holes 141 may have circumscribing walls 145 (FIG. 13) that extend axially downward therefrom. In one version, the walls 145 may be frustoconical in shape.

In some embodiments, the container 121 may further include a plurality of rows of holes in the base 123. For example, in the illustrated embodiment, base 123 may include rows 151, 153 (FIGS. 12-14), each having holes 157. Base 123 may have more or fewer rows 151, 153, and more or fewer holes 157. Holes 157 may be identical, or may differ from each other in some aspect. In one version, the holes 157 in each individual row 151, 153 may be aligned with each other. In another version, the holes 157 in each individual row 151, 153 may be co-planar. In some embodiments, the rows 151, 153 may be parallel to each other and, optionally, to the trough 129. As shown in the drawings, at least some of the rows 151, 153 may be at different vertical elevations relative to the axis 125 and to each other. For example, the rows 151, 153 may be arrayed in a terraced pattern, as depicted. In another example, the rows 151, 153 may be grouped in pairs of identical rows (e.g., two rows 151 and two rows 153).

In one version, at least some of the holes 157 in the rows 151, 153 may be cylindrical. In another version, the holes 141 in the trough 129 may differ in size from the holes 157 in the rows 151, 153. For example, the holes 141 in the trough may be larger than the holes 157 in the rows 151, 153. In another example, the holes 157 in the rows 151, 153 may be substantially the same size. In some embodiments, at least some of the holes 157 in the rows 151, 153 may include circumscribing walls 159 (FIGS. 13 and 14) extending axially upward therefrom. In one version, the walls 59 may be cylindrical or other shapes.

In some embodiments, the base 123 may be integrally formed with the sidewall 131, such that the container 121 is monolithic. In other embodiments, the base 123 may be seated adjacent a bottom on an interior of the sidewall 131, such that the base 123 is removable from the sidewall 131. For example, the sidewall 131 may include an inner lip 133 (FIGS. 13 and 15) circumscribing the bottom, such that the base 123 seats on the inner lip 133. In a version, the base 123 may have an interference fit with the sidewall 131, such that the base 123 is snugly retained by the sidewall 131.

Embodiments of the container 121 may include legs. For example, container 121 may include legs 161, 163, 165, which may extend axially downward from the sidewall 131. In some versions, the legs 161, 163, 165 may include at least two different lengths, or at least three different lengths, as shown. In an example, the legs 161, 163, 165 may be laterally inset (FIGS. 9 and 10) by a distance I from an outer surface of the sidewall 131. In some embodiments, the legs 161, 163, 165 may or may not be parallel to the sidewall 131. In another version, the legs 161, 163, 165 and the sidewall 131 may or may not be parallel to the axis 125. Embodiments of the container 121 may include feet 167 at bottoms of the legs 161, 163, 165. In an example, the container 121 may have only two feet 167. In another example, half of the legs 161, 163, 165 may be coupled to each foot 167. Versions of the feet 167 may be spaced apart from each other, such that a space is defined between the feet directly beneath the trough 129. In addition, the feet 167 may be planar, and the feet 167 can be perpendicular to the axis 125. A version of the feet 167 may be rectilinear, as shown. The feet 167 also may include drainage holes 169.

In some embodiments, a gutter 171 may be provided for container 121. In the illustrated embodiment of FIG. 8, the gutter 171 may comprise a u-shaped structural channel, but could comprise other shapes as well, such as semi-cylindrical. The gutter 171 may be located between and straddled by feet 167, which may be positioned directly beneath trough 129. In this way, gutter 171 may be used to catch and channel liquid drainage from trough 129 of container 121 to a desired location.

Figure 16:
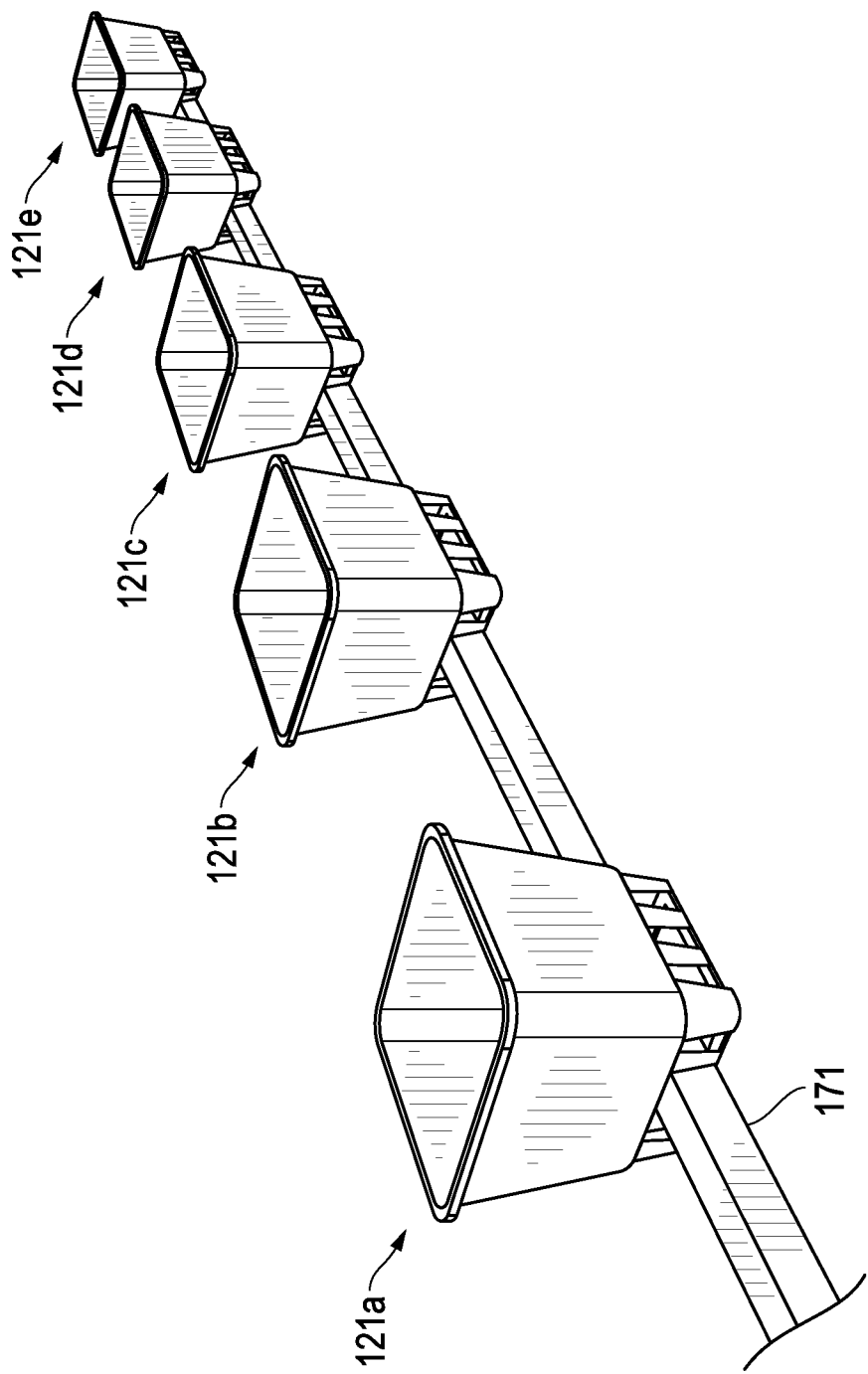
FIG. 16 is an isometric view of an embodiment of several containers in operation.

The length of gutter 171 may vary depending on the application. For example, in operation a plurality of containers 121 (FIG. 16) may be aligned along a single gutter 171, such their collective fluids drainage may be pooled and directed as desired. In other versions, several gutters 171 may be coupled together depending on the application. Although FIG. 16 depicts five containers 121a-121e, fewer or more containers 121 may be employed depending on the application.

Figure 15:
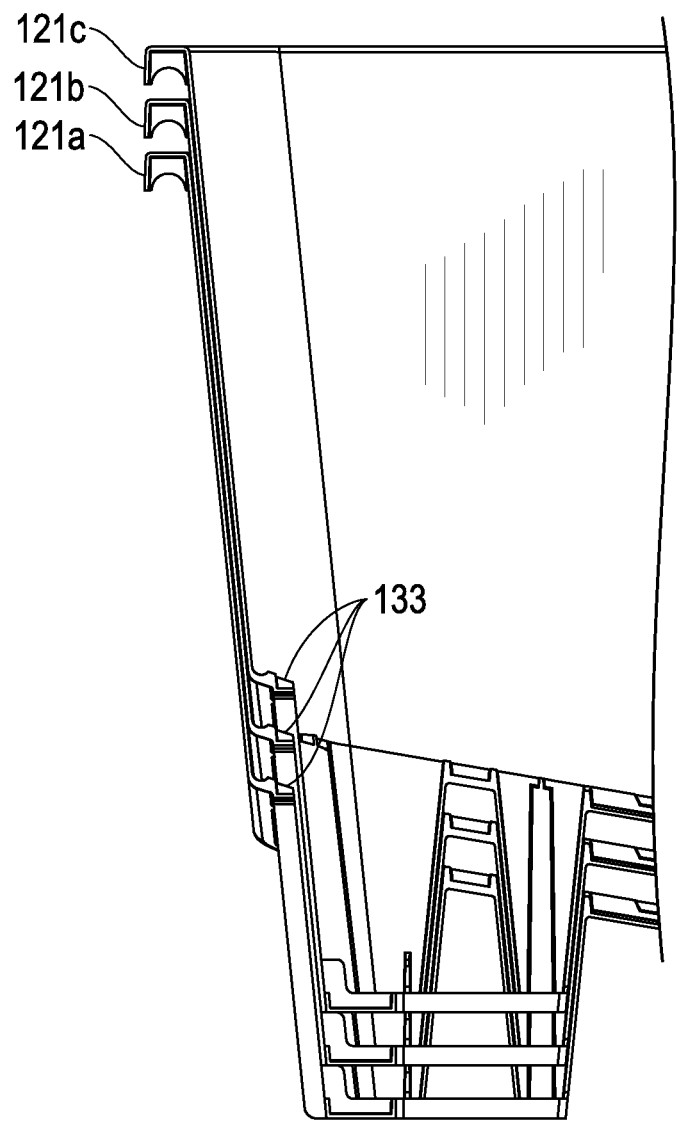
FIG. 15 is half-sectioned side view of a stack of three of the containers of FIG. 8.

FIG. 15 depicts a stack of three of the containers 121, with their panels or bases 123 removed, such that they are hollow. The lowest container 121a closely receives the second container 121b, which closely receives the third container 123c. Since the bases 123 are removed, the legs of all three containers extend through and are visible from the exterior of the lowest container 121a.

The embodiments described herein may have advantages over prior art designs. For example, the present designs favorably utilize water surface tension to collect drainage from the containers in a cost effective matter, while allowing oxygen uptake in the roots. When the plant substrate within the container is properly moist but not oversaturated, no drainage may originate from the holes at the highest vertical elevation. Rather, drainage may originate only from the holes at the lowest vertical elevation. This is due to the pressure being higher on the lower holes. Therefore, the surface tension prevents drainage from the higher holes of the containers.

In another embodiment, the tray or base may be modified to have only a single hole at the lowest elevation, such as a trough. In addition, the gutter could be a pipe, such that the single hole drains into the pipe.

Other versions may include one or more of the following embodiments:

Embodiment 1

A container, comprising:
a base having an axis, a width transverse to the axis, a bottom, and a sidewall extending axially upward from and circumscribing the base; and
a tier of holes in the base, the holes in the tier span a substantially entire width of the base, and the tier of holes is at a substantially lowest elevation of the base to define a trough at the bottom of the base.

Embodiment 2

The container of any of these embodiments, wherein the trough intersects the axis and the holes are aligned linearly.

Embodiment 3

The container of any of these embodiments, wherein the trough is at a different elevation than another portion of the base.

Embodiment 4

The container of any of these embodiments, wherein the trough is at a substantially constant elevation with respect to the axis, such that the holes in the tier of holes are substantially co-planar.

Embodiment 5

The container of any of these embodiments, wherein the holes in the tier of holes are not co-planar.

Embodiment 6

The container of any of these embodiments, wherein a convex crease linearly bisects the trough, such that portions of each hole are inclined relative to each other.

Embodiment 7

The container of any of these embodiments, wherein the holes comprise a span that is transverse to the axis, and the span is at least about 90% of the width, at least about 80% of the width.

Embodiment 8

The container of any of these embodiments, wherein the holes are spaced apart from ends of the trough, such that no holes coincide with the ends of the trough.

Embodiment 9

The container of any of these embodiments, wherein the holes are frustoconically tapered.

Embodiment 10

The container of any of these embodiments, wherein the holes are not cylindrical.

Embodiment 11

The container of any of these embodiments, wherein at least some of the holes have circumscribing walls extending axially downward therefrom.

Embodiment 12

The container of any of these embodiments, wherein the circumscribing walls are frustoconical.

Embodiment 13

The container of any of these embodiments, further comprising a plurality of rows of holes in the base.

Embodiment 14

The container of any of these embodiments, wherein the holes in each individual row are aligned with each other.

Embodiment 15

The container of any of these embodiments, wherein the holes in each individual row are co-planar.

Embodiment 16

The container of any of these embodiments, wherein the rows are parallel to each other and to the trough.

Embodiment 17

The container of any of these embodiments, wherein at least some of the rows are at different vertical elevations relative to each other.

Embodiment 18

The container of any of these embodiments, wherein the rows are arrayed in a terraced pattern.

Embodiment 19

The container of any of these embodiments, wherein the rows are grouped in pairs of identical rows.

Embodiment 20

The container of any of these embodiments, wherein at least some of the holes in the rows are cylindrical.

Embodiment 21

The container of any of these embodiments, wherein the holes in the tier differ in size from the holes in the rows.

Embodiment 22

The container of any of these embodiments, wherein the holes in the tier are larger than the holes in the rows.

Embodiment 23

The container of any of these embodiments, wherein the holes in the rows are substantially the same size.

Embodiment 24

The container of any of these embodiments, wherein at least some of the holes in the rows have circumscribing walls extending axially upward therefrom.

Embodiment 25

The container of any of these embodiments, wherein the circumscribing walls are cylindrical.

Embodiment 26

The container of any of these embodiments, wherein the base and the sidewall comprise two or more components that are assembled together.

Embodiment 27

The container of any of these embodiments, wherein the base is removable from the sidewall.

Embodiment 28

The container of any of these embodiments, wherein the sidewall has an interior with a bottom, an inner lip circumscribing at least adjacent the bottom, and the base seats on the inner lip.

Embodiment 29

The container of any of these embodiments, wherein the base has an interference fit with the sidewall, such that the base is snugly retained by the sidewall.

Embodiment 30

The container of any of these embodiments, wherein the base is tapered in at least one direction.

Embodiment 31

The container of any of these embodiments, wherein the base is tapered in at least two directions.

Embodiment 32

The container of any of these embodiments, wherein first sides of the base taper downward toward the trough, and second sides of the base taper downward toward ends of the first sides of the base, such that an axially lowest portion of the base is located at the trough, and an axially highest portion of the base is located at midpoints of the second sides.

Embodiment 33

The container of any of these embodiments, wherein the container is round and the trough is diametral.

Embodiment 34

The container of any of these embodiments, wherein the container is polygonal, the sidewall comprises a plurality of sidewalls, and the trough extends between opposite sidewalls.

Embodiment 35

The container of any of these embodiments, wherein the container comprises legs that extend axially downward from the sidewall.

Embodiment 36

The container of any of these embodiments, wherein the legs have at least two different lengths, or at least three different lengths.

Embodiment 37

The container of any of these embodiments, wherein the legs are laterally inset from an outer surface of the sidewall.

Embodiment 38

The container of any of these embodiments, wherein the legs are parallel to the sidewall.

Embodiment 39

The container of any of these embodiments, wherein the legs and the sidewall are not parallel to the axis.

Embodiment 40

The container of any of these embodiments, wherein the legs comprise feet at bottoms of the legs.

Embodiment 41

The container of any of these embodiments, wherein there are only two feet, and half of the legs are coupled to each foot.

Embodiment 42

The container of any of these embodiments, wherein the feet are spaced apart from each other directly beneath the trough.

Embodiment 43

The container of any of these embodiments, wherein the feet comprise drainage holes.

Embodiment 44

The container of any of these embodiments, wherein the feet are planar and perpendicular to the axis.

Embodiment 45

The container of any of these embodiments, wherein the feet are arcuate.

Embodiment 46

The container of any of these embodiments, wherein the feet are rectilinear.

Embodiment 47

The container of any of these embodiments, wherein the container is round, and each row comprises a chord of the round container, such that the holes of each row extend substantially to both intersections of the respective cord and sidewall.

Embodiment 48

The container of any of these embodiments, wherein the container is square and each row extends a substantially full distance between opposite side walls of the square container.

Embodiment 49

A container, comprising:
a base having an axis, a sidewall extending axially upward from and circumscribing the base, a bottom having an upper elevation and a lower elevation that is axially lower than the upper elevation, and the lower elevation defines a trough at a central and lowest-most portion of the base; and
a first set of holes in the trough at the lower elevation configured to permit liquid drainage from the container, and a second set of holes in the upper elevation configured to substantially only permit air uptake to roots of a plant in the container and configured to not facilitate liquid drainage from the container.

Embodiment 50

A container, comprising:
a base having an axis, a width transverse to the axis, a bottom with holes, a sidewall extending axially upward from and circumscribing the base, a plurality of legs extending below lowest-most holes in the base, and feet connecting the plurality of legs; and
the container has only two feet, and half of the legs are coupled to each foot.

Embodiment 51

A container, comprising:
a body that is hollow and having an open top and an open bottom, each with no closure, and the open top and the open bottom are similar in size; and
a tray configured to seat inside the body adjacent the open bottom of the container to substantially close the open bottom.

Embodiment 52

The container of any of these embodiments, wherein the first set of holes is not at a lowest elevation of the base.

Embodiment 53

The container of any of these embodiments, wherein the first set of holes is configured to be elevated above an underlying support surface of the container.

Embodiment 54

The container of any of these embodiments, further comprising a gutter configured to collect drainage from the container.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An assembly, comprising:
a plurality of containers spaced apart from each other and arranged in a linear configuration; each container comprising:
a base with a perimeter, an axis that is vertical, a width transverse to the axis, a bottom, and a perimeter sidewall extending axially upward from and circumscribed about an entirety of the perimeter of the base;
a tier of holes in the base, the holes in the tier of holes span the width within the perimeter sidewall, the tier of holes is at a lowest elevation of the base to define a trough at the bottom of the base, the trough intersects the axis, the trough spans substantially an entire width of the base within the perimeter sidewall and has an elevation that is at or proximate to a constant elevation with respect to the axis, such that the holes in the tier of holes are co-planar with the elevation and the holes are aligned linearly in a straight line;
legs that extend axially downward from the perimeter sidewall, the legs support the container on an underlying surface, the legs form first and second gaps below opposing sides of the perimeter sidewall, and the first and second gaps are aligned linearly in a straight line with the holes; and the assembly further comprises:
a single gutter extending under the bases of the containers and straddled by the first and second gaps of the containers to collect drainage from the holes.

* * * * *